US012485440B2

(12) United States Patent
Shazuki

(10) Patent No.: US 12,485,440 B2
(45) Date of Patent: Dec. 2, 2025

(54) S VALVE STRUCTURE FOR ACCUMULATOR SPRAY

(71) Applicant: CANYON CORPORATION, Tokyo (JP)

(72) Inventor: Mitsuaki Shazuki, Sanyo Onoda (JP)

(73) Assignee: CANYON CORPORATION, Tokyo (JP)

( * ) Notice: Subject to any disclaimer, the term of this patent is extended or adjusted under 35 U.S.C. 154(b) by 225 days.

(21) Appl. No.: 18/259,398

(22) PCT Filed: Dec. 22, 2021

(86) PCT No.: PCT/JP2021/047557

§ 371 (c)(1),
(2) Date: Jun. 27, 2023

(87) PCT Pub. No.: WO2022/145307

PCT Pub. Date: Jul. 7, 2022

(65) Prior Publication Data

US 2024/0058830 A1 Feb. 22, 2024

(30) Foreign Application Priority Data

Dec. 29, 2020 (JP) ................................ 2020-219864

(51) Int. Cl.
*B05B 11/00* (2023.01)
*B05B 11/10* (2023.01)

(52) U.S. Cl.
CPC ......... *B05B 11/007* (2013.01); *B05B 11/1011* (2023.01); *B05B 11/1047* (2023.01); *B05B 11/1074* (2023.01); *B05B 11/1077* (2023.01)

(58) Field of Classification Search
CPC ............... B05B 11/007; B05B 11/1011; B05B 11/1047; B05B 11/1074; B05B 11/1077;
(Continued)

(56) References Cited

U.S. PATENT DOCUMENTS 4,989,790 A * 2/1991 Martin .................. B05B 1/3452 239/483
6,669,061 B2 * 12/2003 Tada .................. B05B 11/0032 222/153.13
(Continued)

FOREIGN PATENT DOCUMENTS

CN 111924318 A 11/2020
JP 2013057311 A 3/2013
(Continued)

OTHER PUBLICATIONS

The extended European search report of the corresponding EP application No. 21915167.7 mailed Oct. 16, 2024.

*Primary Examiner* — Vishal Pancholi
(74) *Attorney, Agent, or Firm* — Muncy, Geissler, Olds & Lowe, P.C.

(57) ABSTRACT

[Summary]
[Object] To provide an S valve structure to be incorporated in an accumulator spray with a reduced pulling force of a trigger portion E.
[Solution] The present invention is directed to an S valve structure A in an accumulator spray to be attached to a container to suction liquid in the container from an introduction tube H via an F valve into a main cylinder portion, apply pressure to the liquid in the main cylinder and, when the pressure exceeds a certain pressure, eject the liquid via an S valve structure A from a nozzle portion F wherein the S valve structure A is formed of a spring portion 1 and a valve piston portion 2 drooping from the spring portion 1, and the valve piston portion 2 includes a core rod portion 21, an outer skirt portion 22 extending downward from an outer circumference of the core rod portion 21 and an inner skirt portion 23 longer than the outer skirt portion 22.

8 Claims, 14 Drawing Sheets

(58) Field of Classification Search
CPC ............. B05B 11/0008; B05B 11/1069; F16K 2200/305; F16K 15/141
See application file for complete search history.

(56) References Cited

U.S. PATENT DOCUMENTS

| | | | | |
|---|---|---|---|---|
| 12,246,333 | B2 * | 3/2025 | Liang | B05B 11/007 |
| 2011/0147419 | A1 * | 6/2011 | Tada | B05B 11/1011 222/383.1 |
| 2014/0183283 | A1 * | 7/2014 | Tada | B05B 11/1011 239/527 |

FOREIGN PATENT DOCUMENTS

| | | | | |
|---|---|---|---|---|
| JP | 2016026862 | A | * | 2/2016 |
| JP | 2017-13008 | A | | 1/2017 |

* cited by examiner (A)

(B)

S VALVE STRUCTURE FOR ACCUMULATOR SPRAY

TECHNICAL FIELD

The present invention relates to an S valve structure for an accumulator spray and, in more detail, to an S valve structure for an accumulator spray with a reduced pulling force of a trigger portion.

BACKGROUND ART

As a liquid-ejecting spray, there is a so-called accumulator sprayer including a special S valve for enhancing an ejection force.

In general, this accumulator spray is configured to, when a piston is slid with respect to a cylinder, instantaneously eject, from a nozzle, liquid in the cylinder in a state in which its pressure exceeds a certain pressure.

More specifically, in a state in which portions where a flow of liquid is open and closed (that is, an F valve and an S valve) are sealed with a valve body and a valve seat, when pressure inside of the cylinder positioned between the F valve and the S valve is accumulated to become equal to or larger than a certain pressure, a space between the valve body and the valve seat of the S valve is opened, and the liquid is pushed out from the inside of the cylinder to be ejected from the nozzle to the outside.

In this case, the valve body of the S valve is pressurized to the valve seat via the spring force of a relatively strong spring. In a state in which the F valve is closed, when the fluid pressure inside the cylinder exceeds this spring force, the valve body and the valve seat of the S valve are suddenly opened to allow passage of the liquid.

Since the S valve is suddenly opened to release the fluid pressure, the liquid is ejected at a dash to the outside. After that, with the inside of the cylinder being released, the S valve is closed again (that is, a space between the valve body and the valve seat is closed).

In the accumulator spray, the liquid inside the cylinder can be ejected at a dash to the outside, which is quite useful.

As this accumulator spray, for example, several ones have been applied by Applicant.

For example, disclosed in PTL 1 is an accumulator trigger sprayer which, in a state of being attached to a container, moves a piston portion with rotation of a trigger portion, applies pressure to liquid inside a cylinder portion of the cylinder portion and, when the pressure becomes a certain pressure, ejects the liquid via a passage P from a nozzle portion.

And, since the cylinder portion has a relatively short lateral length, an area behind the cylinder portion can be sufficiently ensured. In that area, the S valve formed of a first valve body and a first valve seat and a coil spring are incorporated.

CITATION LIST

Patent Literature

PTL 1: Japanese Patent Application Laid-Open No. 2017-13008

SUMMARY OF INVENTION

Technical Problem

This accumulator spray is highly convenient, and has been increasingly used in recent years.

Meanwhile, in the accumulator spray, a relatively strong pulling force of the trigger portion E is required.

For this, it is quite important in seeking further convenience to reduce the pulling force of the trigger portion E as much as possible and allow weak people such as elderly people and children to also easily use the accumulator spray.

Here, to reduce the pulling force of the trigger portion, it is required to make the diameter of the cylinder portion small.

However, if the diameter of the cylinder portion is made small, the length of the cylinder portion has to be inevitably extended in view of ejection capacity.

With this, in a limited inner space of the conventional accumulator spray, the installation area of the S valve is used up by the extended cylinder portion, and the installation space of the S valve and the spring which presses it cannot be ensured.

The present invention was made with the above-described circumstances as a background, and has an object of providing an S valve structure to be incorporated in an accumulator spray with a reduced pulling force of the trigger portion E.

Solution to Problems

As a result of diligent studies to solve the above-described problem, the inventor has found that the above-described problem can be solved by arranging the spring portion on an upper side as much as possible and providing therebelow a portion for opening and closing a passage leading to the nozzle portion, and has completed the present invention.

That is, the present invention resides in (1) an S valve structure A in an accumulator spray to be attached to a container to suction liquid in the container from an introduction tube H via an F valve into a main cylinder portion, apply pressure to the liquid in the main cylinder and, when the pressure exceeds a certain pressure, eject the liquid via the S valve structure A from a nozzle portion F, in which the S valve structure A is formed of a spring portion 1 and a valve piston portion 2 drooping from the spring portion 1, and the valve piston portion 2 includes a core rod portion 21, an outer skirt portion 22 extending downward from an outer circumference of the core rod portion 21 and an inner skirt portion 23 longer than the outer skirt portion 22.

That is, the present invention resides in the S valve structure A described in the above 1, in which (2) the spring portion 1 is in an inverted dome shape.

That is, the present invention resides in the S valve structure A described in the above 1, in which (3) with part of the spring portion 1 inserted and fixed to the valve piston portion 2, both are integrated.

That is, the present invention resides in the S valve structure A described in the above 1, in which (4) the valve piston portion 2 has an upper flange portion 24.

That is, the present invention resides in the S valve structure A described in the above 1, in which (5) the valve piston portion 2 has a center hole 21A formed therein, and is open at a center portion of the spring portion 1.

That is, the present invention resides in (6) an accumulator spray including the S valve structure A described in any one of the above 1 to 5.

Advantageous Effects of Invention

1) The present invention is directed to an S valve structure A in an accumulator spray to be attached to a container to suction liquid in the container from an introduction tube H via an F valve into a main cylinder portion, apply pressure to the liquid in the main cylinder and, when the pressure exceeds a certain pressure, eject the liquid via the S valve structure A from a nozzle portion F, in which the S valve structure A is formed of a spring portion 1 and a valve piston portion 2 drooping from the spring portion 1, and the valve piston portion 2 includes a core rod portion 21, an outer skirt portion 22 extending downward from an outer circumference of the core rod portion 21 and an inner skirt portion 23 longer than the outer skirt portion 22. With this, the downward pressurizing force by the spring portion 1 is appropriately transferred to the valve piston portion 2.

2) Since the spring portion 1 is in an inverted dome shape, the shape is uniform in a circumferential direction and has no directivity. Thus, it is possible to uniformly abut on a support wall portion C1 of a cover portion C, and its counterforce also becomes uniform.

Also, because of having no directivity, the spring portion 1 is stably attached.

Also, upward and downward movements of the valve piston portion 2 can be smoothly performed.

3) With part of the spring portion 1 inserted and fixed to the valve piston portion 2, both are integrated. With this, the material of the spring portion 1 and the material of the valve piston portion 2 can be made different. Also, if either one is broken, that can be replaced with a new one.

4) Since the valve piston portion 2 has an upper flange portion 24, when the S valve structure A is incorporated in the accumulator spray, a lateral swing of the valve piton portion 2 and so forth can be prevented.

5) Since the valve piston portion 2 has a center hole 21A formed therein and is open at a center portion of the spring portion 1, elasticity can be exerted, it is also possible to save material at the time of injection molding.

6) Since an accumulator spray is configured to include the S valve structure A described in any one of the above 1 to 5, the pulling force is reduced as an accumulator spray.

BRIEF DESCRIPTION OF DRAWINGS

FIG. 2 is a longitudinal sectional view depicting the S valve structure in the embodiment of the present invention, in which FIG. 2(A) depicts the structure at normal times and FIG. 2(B) depicts the structure at the time of deformation.

FIG. 7 is a view depicting a relation between a lower end portion of an inner skirt portion and a vertical groove portion, in which FIG. 7(A) depicts a state in which the S valve structure is closed and FIG. 7(B) depicts a state in which the S valve structure is open.

FIG. 13 depicts another modification example of the S valve structure, in which FIG. 13(A) is a perspective view and FIG. 13(B) is a plan view.

DESCRIPTION OF EMBODIMENTS

Figure 1:
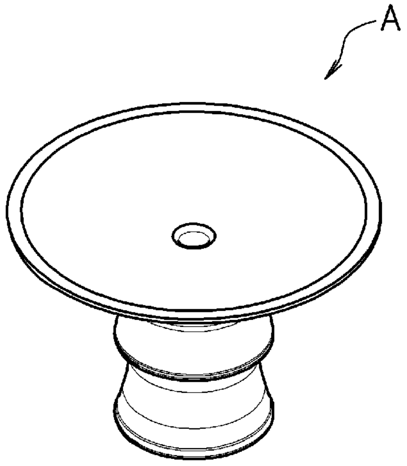
FIG. 1 is a perspective view depicting an S valve structure in an embodiment of the present invention.

In the following, with reference to the drawings as required, a preferred embodiment of the present invention is described in detail.

Note in the drawings that the same components are provided with the same reference numeral and redundant description is omitted.

Also, relations in position such as above, below, left, and right are assumed to be based on the position relation depicted in the drawings unless otherwise specified.

Furthermore, the dimensional ratios of the drawings are not limited to the ratios depicted in the drawings.

Embodiment

The present invention relates to an S valve structure A to be incorporated in an accumulator spray X, and is used for the accumulator spray X with a reduced pulling force.

Here, this accumulator spray X is configured to be attached to the container to suction liquid in a container from an introduction tube H via an F valve into a main cylinder portion B1, then apply pressure to the liquid in the main cylinder portion and, when the pressure exceeds a certain pressure, eject the liquid at a dash via the S valve structure A from a nozzle portion F.

The structure of this accumulator spray X will be described further below.

(S Valve Structure)

FIG. 1 is a perspective view depicting the S valve structure A in an embodiment of the present invention.

Figure 2:
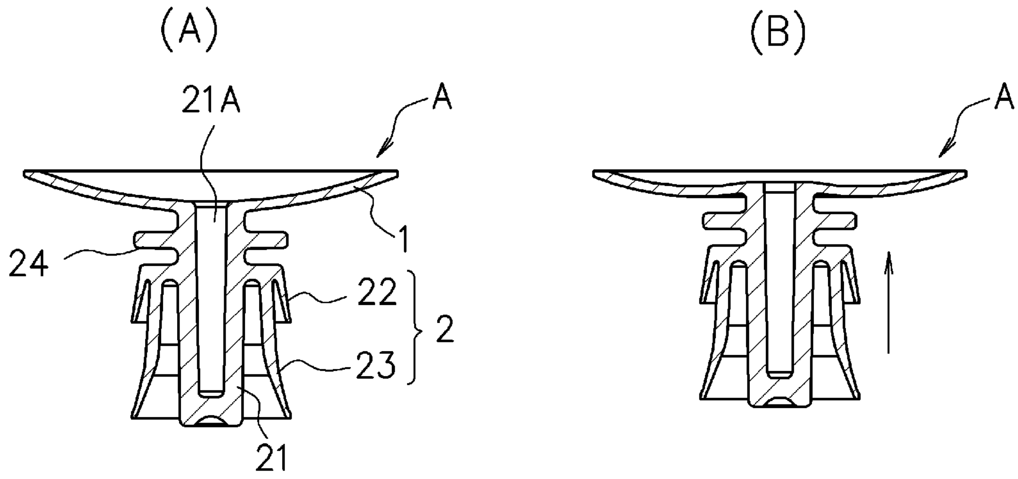

Also, FIG. 2 is a longitudinal sectional view depicting the S valve structure A in the embodiment of the present invention, in which FIG. 2(A) depicts the structure at normal times and FIG. 2(B) depicts the structure at the time of deformation.

At the time of deformation, in a state in which the S valve structure A is incorporated in an accumulator spray X, when a valve piston portion 2 moves upward, a spring portion 1 is deformed in this manner.

Figure 3:
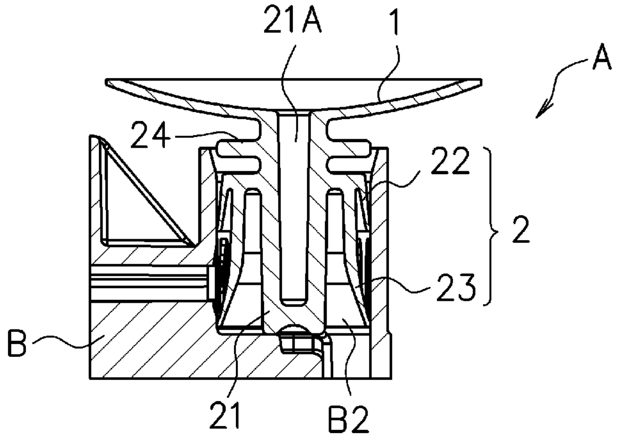
FIG. 3 is a part of a longitudinal sectional view depicting a state in which the S valve structure is incorporated in a sub-cylinder portion of an accumulator spray in the embodiment of the present invention.

Also, FIG. 3 is a part of a longitudinal sectional view depicting a state in which the S valve structure A is incorporated in a sub-cylinder portion B2 of the accumulator spray X in the embodiment of the present invention.

The S valve structure A is formed of the spring portion 1 and the valve piston portion 2 drooping from the spring portion 1.

In this embodiment, the spring portion 1 is formed in an inverted dome shape (in other words, a dish shape) so as to be able to exert a spring-back effect as the S valve structure A.

On the other hand, the valve piston portion 2 includes a core rod portion 21 and skirt portions extending downward from the outer circumference of the core rod portion 21.

The number of skirt portions is two, and the skirt portions are formed of an outer skirt portion 22 and an inner skirt portion 23 extending long downward from the outer skirt portion 22.

Here, although will be described further below, the outer skirt portion 22 plays a role of sealing, and also the inner skirt portion 23 plays a role of a valve body.

The core rod portion 21 of the valve piston portion 2 is formed to have a hollow, and its hollow hole 21A is open at the center of the inverted-dome-shaped spring portion 1.

In this manner, with the hollow hole 21A provided in the core rod portion 21, elasticity can be more appropriately exerted as the valve piston portion 2.

In this regard, when the S valve structure A is incorporated in the accumulator spray, in a state in which S valve structure A is closed, the S valve structure A has its upper end portion supported by a support wall portion C1 of a cover portion C, as will be described further below.

On the other hand, its lower end portion is press-contacted with the bottom of the sub-cylinder portion B2.

Here, the sub-cylinder portion B2 can be said as a cylindrical space for accommodating the S valve structure A formed above a base body B.

That is, the upper end portion of the dome-shaped spring portion 1 is supported by the support wall portion C1, which is a part of the cover portion C, and the lower end portion of the valve piston portion 2 is press-contacted with the bottom of the sub-cylinder portion B2 of the base body B.

Since the inverted-dome-shaped spring portion 1 has a shape uniform in a circumferential direction and is not directional, it can uniformly abut on the support wall portion C1 of the cover portion C and, as a matter of course, its counterforce is uniform without imbalance.

In this manner, since the S valve structure A includes the spring portion 1 on an upper side and includes the valve piston portion 2 having the function of a valve body on a lower side, even if the main cylinder portion B1 is elongated, the disposition space of the S valve structure A can be sufficiently ensured.

Note that an upper flange portion 24 formed on the core rod portion 21 of the valve piston portion 2 can prevent a lateral swing of the valve piston portion 2 and so forth when the S valve structure A is incorporated in the accumulator spray.

(Accumulator Spray)

Figure 4:
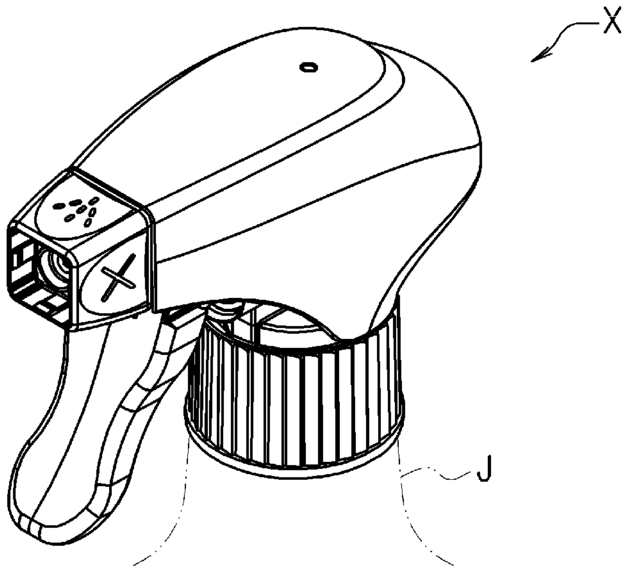
FIG. 4 is a perspective view depicting an accumulator spray X with the S valve structure in the embodiment of the present invention incorporated therein.

FIG. 4 is a perspective view depicting the accumulator spray X with the S valve structure A in the embodiment of the present invention incorporated therein.

Figure 5:
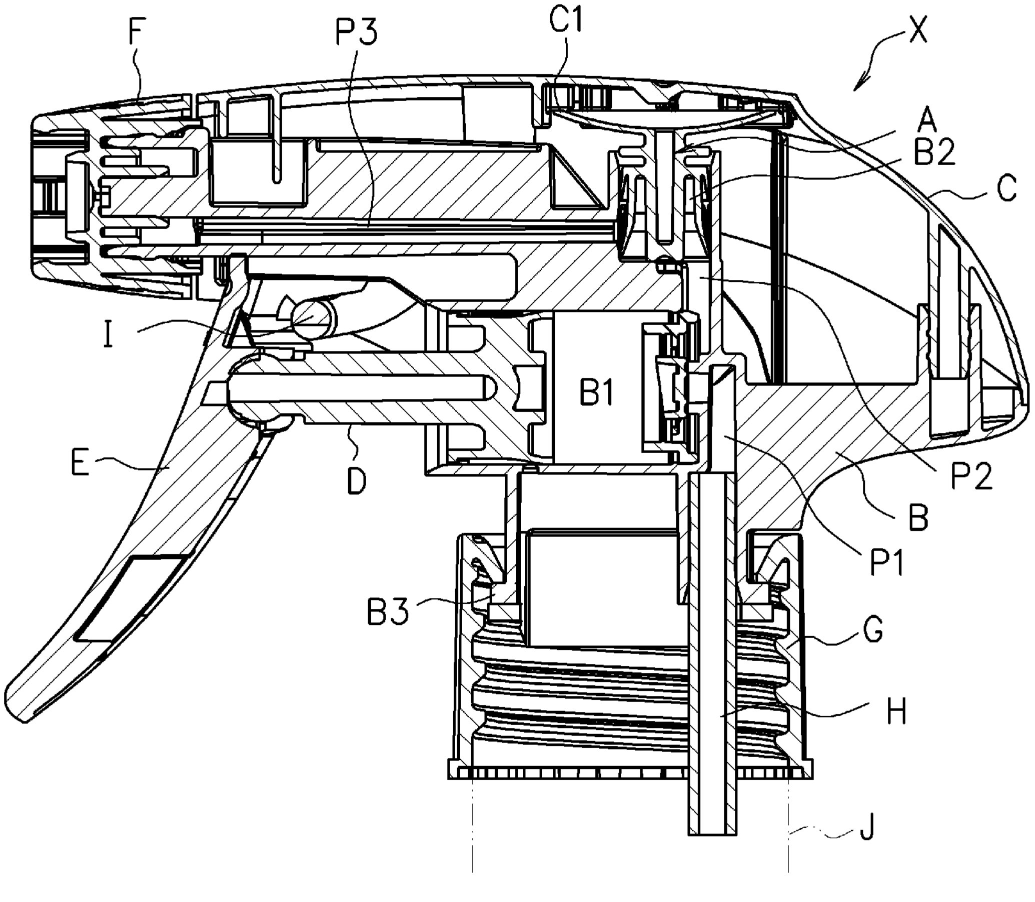
FIG. 5 is a longitudinal sectional view depicting the accumulator spray X with the S valve structure in the embodiment of the present invention incorporated therein.

Also, FIG. 5 is a longitudinal sectional view depicting the accumulator spray X with the S valve structure A in the embodiment of the present invention incorporated therein.

The accumulator spray X of the present invention is used in a state of being attached to a mouth portion of a container J.

Note that the use method will be described further below.

(Structure of Accumulator Spray)

As for the structure, the accumulator spray X includes the nozzle portion F, the base portion B (having the main cylinder portion B1, the sub-cylinder portion B2, a first passage portion P1, a second passage portion P2, a third passage portion P3, and so forth), a piston portion D, the cover portion C, a trigger portion E, the S valve structure A, an F valve FV, the introduction tube H, a trigger-specific return spring I, and a cap portion G.

Also, the accumulator spray includes the cover portion C which covers the base portion B.

Here, the base portion B is an important portion having passages where liquid flows, including the main cylinder portion B1 which accepts the piston portion D, the sub-cylinder portion B2 which accepts the S valve structure A, the first passage portion P1 which introduces the liquid in the container to the main cylinder portion B1, the second passage portion P2 which makes introduction from the main cylinder portion B1 to the sub-cylinder portion B2 where the S valve structure A is present, and the third passage portion P3 which introduces the liquid from the sub-cylinder portion B2 to the nozzle portion F.

Note that a lower flange portion B3 is provided at a lower end of the base body B and, with this lower flange portion B3 interposed between an upper end portion of the container J and the cap portion G, the accumulator spray X is reliably attached to the container J.

Meanwhile, as described above, a part of an inner side of the cover portion C serves as the support wall portion C1 where the spring portion 1 of the S valve structure A abuts.

In a state in which a circumferential end of the inverted-dome-shaped spring portion 1 abuts on this support wall portion C1, the spring portion 1 presses the valve piston portion 2 of the S valve structure A downward.

The sub-cylinder portion B2 forms, with its inner circumferential wall, a space provided on a downstream side of the second passage portion P2.

Note that the F valve FV is provided to the first passage portion P1 between the main cylinder portion B1 and the container J and, on the other hand, the S valve structure A is provided between the main cylinder portion B1 and an inlet of a passage for sending the liquid to the nozzle portion F (that is, the third passage portion P3).

In this regard, the flow of the liquid is as follows: container J→introduction tube H→first passage portion P1→F valve FV→main cylinder portion B1→second passage portion P2→sub-cylinder portion B2→S valve structure A→third passage portion P3→nozzle portion F→outside.

(Inner Circumferential Wall of Sub-Cylinder Portion)

Here, the inner circumferential wall of the sub-cylinder portion B2 has features as a so-called valve seat, and is thus described in detail.

Figure 6:
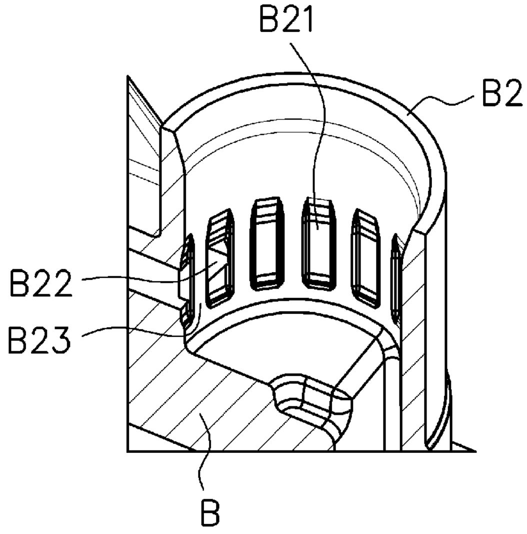
FIG. 6 is a view for describing an inner circumferential wall of the sub-cylinder portion.

FIG. 6 is a view for describing an inner circumferential wall of the sub-cylinder portion B2.

On the inner circumferential wall of the sub-cylinder portion B2, a plurality of recessed vertical groove portions B21 extending in an up-down direction are formed on the entire circumference so as to be regularly spaced.

Among these, a vertical groove portion B21 provided at a position corresponding to the third passage portion P3 positioned at front (that is, nozzle portion side) has, at its bottom, a through hole B22 leading to the third passage portion P3.

And, at the bottom of this vertical groove portion B21, a through hole B22 leading to the third passage portion P3 is provided.

In FIG. 6, it can be found that on both sides of the vertical groove portion B21, a cross stalk B23 is formed so as to obstruct the through hole B22.

The function of this cross stalk B23 is as follows. When the valve piston portion 2 moves upward and downward inside the sub-cylinder portion B2, the cross stalk B23 prevents an end portion of the inner skirt portion 23 from being deformed to fall into the third passage portion P3.

With this, upward and downward movements of the valve piston portion 2 are smoothly made.

And, no through hole B22 is provided to the other vertical groove portions B21 other than the vertical groove portion B21 provided at the position of the third passage portion P3.

Since the vertical groove portions B21 are formed on the entire circumference of the inner circumferential wall of the sub-cylinder portion B2, in a state in which a lower end portion 23A of the inner skirt portion 23 is at a vertical position below a lower limit portion of the vertical groove portions B21, this is a closed state for the S valve structure A.

When a lower end portion of the inner skirt portion 23 is positioned at a vertical position between an upper limit portion and the lower limit portion of the vertical groove portions B21, the liquid passes through the vertical groove portions B21 to move so as to escape from a lower side to an upper side of the inner skirt portion 23.

That is, this is a closed state for the S valve structure A.

Figure 7:
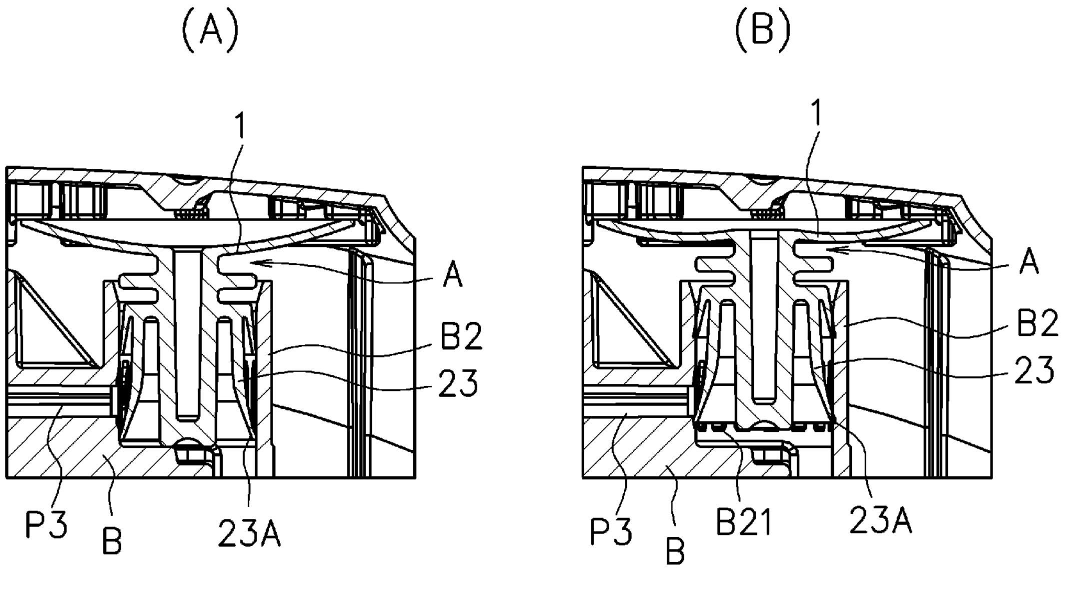

FIG. 7 is a view depicting a relation between the lower end portion of the inner skirt portion 23 and the vertical groove portion B21, in which FIG. 7(A) depicts a state in which the S valve structure A is closed and FIG. 7(B) depicts a state in which the S valve structure A is open.

Note that the outer skirt portion 22 is press-contacted with the inner wall of the sub-cylinder portion B2, and the liquid flowing above the inner skirt portion 23 does not move above the outer skirt portion 22.

That is, the outer skirt portion 22 plays a role of sealing.

The moved liquid flows through the through hole B22 at front into the third passage portion P3.

This phenomenon occurs on the entire circumference of the inner skirt portion 23.

Here, in the vertical groove portion B21 provided at the position of the third passage portion P3 (front position), the liquid flows through the through hole B22 formed at the bottom of that vertical groove portion B21 directly into the third passage portion P3.

In this manner, it can be understood that the inner circumferential wall of the sub-cylinder portion B2 plays a role of a valve seat and the inner skirt portion 23 of the valve piston portion 2 plays a role of a valve body.

Next, the flow of the liquid in a series of motions of the accumulator spray X is described.

FIG. 8 to FIG. 11 are diagrams depicting the series of motions after the trigger portion E is pulled until the trigger portion E returns to an original position by a trigger-specific return spring portion I.

Figure 8:
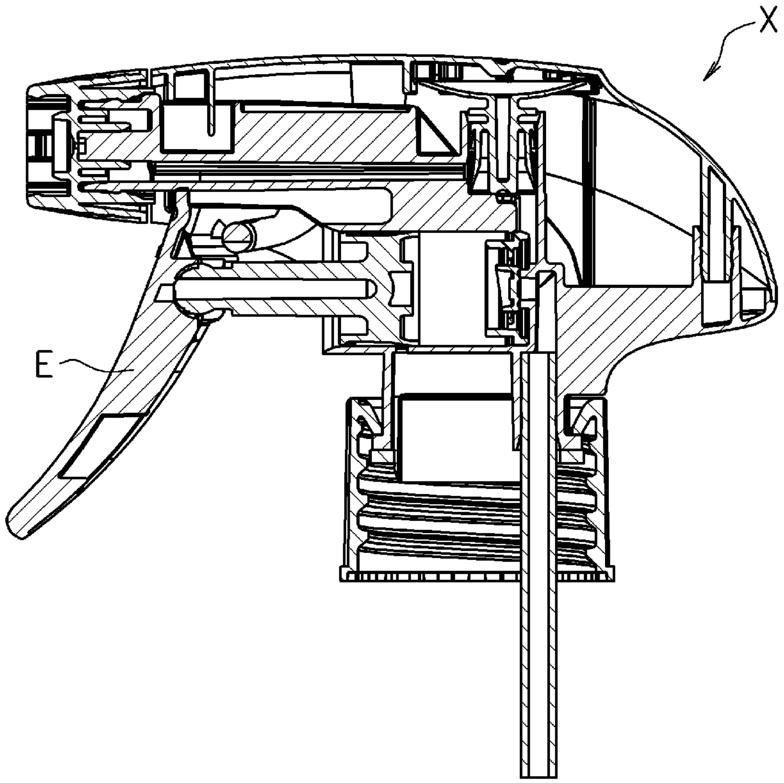
FIG. 8 is a longitudinal sectional view of the accumulator spray in a state in which a trigger portion is not pulled.

FIG. 8 is a longitudinal sectional view of the accumulator spray X in a state in which the trigger portion E is not pulled.

Now, it is assumed that the accumulator spray X is in a state of being filled with liquid.

In a state in which the inside of the main cylinder portion B1 is filled with liquid, with rotation of the trigger portion E, the piston portion D is pulled to a right side in the drawing to be moved.

Figure 9:
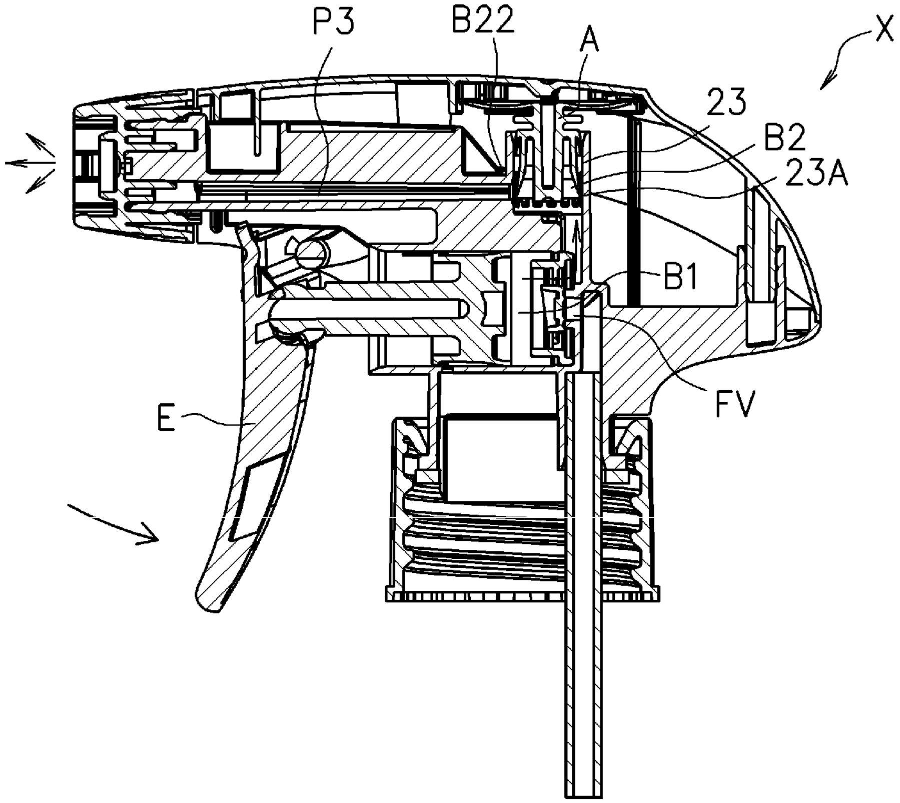
FIG. 9 is a longitudinal sectional view of the accumulator spray in the course of pulling the trigger portion.

FIG. 9 is a longitudinal sectional view of the accumulator spray X in the course of pulling the trigger portion E.

With this, pressure is applied to the liquid inside the main cylinder portion B1 (at this time, the F valve FV is closed) and, upon reception of this fluid pressure, the S valve structure A in the sub-cylinder portion B2 moves upward.

When the lower end portion 23A of the inner skirt portion 23 arrives at the position where the vertical groove portion B21 formed on the inner circumferential wall of the sub-cylinder portion B2 is provided, the liquid flows through the through hole B22 into the third passage portion P3.

Then, the liquid is ejected from the nozzle portion F to the outside.

Figure 10:
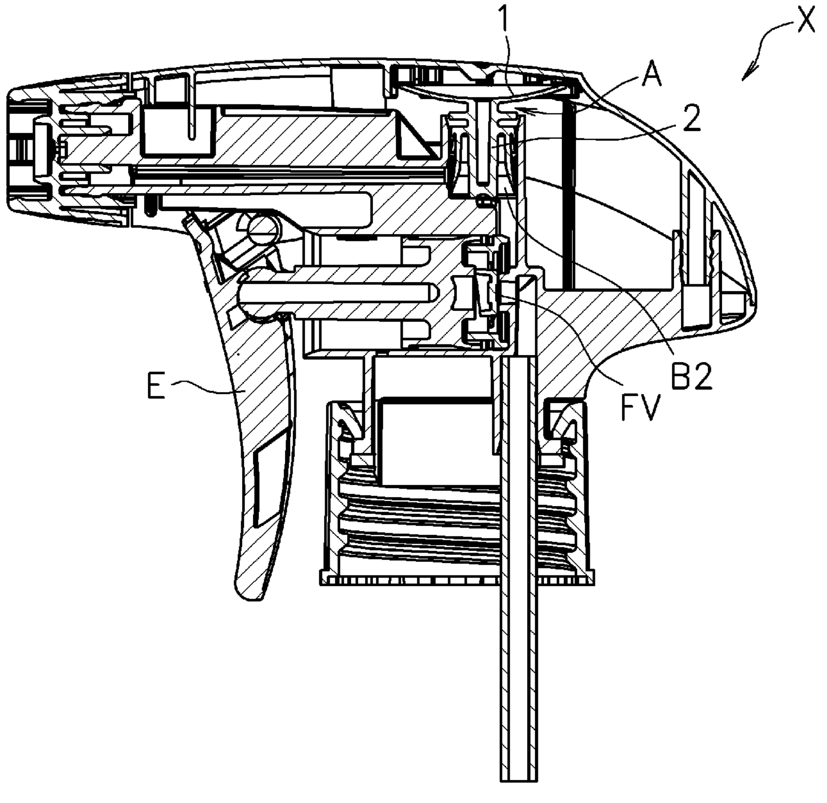
FIG. 10 is a longitudinal sectional view of the accumulator spray in a state in which pulling the trigger portion is completed.

FIG. 10 is a longitudinal sectional view of the accumulator spray X in a state in which pulling the trigger portion E is completed.

After ejection, with the action of the spring portion 1 of the S valve structure A, the valve piston portion 2 moves downward to cause the S valve structure A to be closed.

That is, the lower end portion 23A of the inner skirt portion 23 goes downward below the lowest point of the vertical groove portions B21 in the inner wall of the sub-cylinder portion B2.

Next, with rotation of the trigger portion E to a returning direction, the piston portion D moves to a left side in the drawing.

Figure 11:
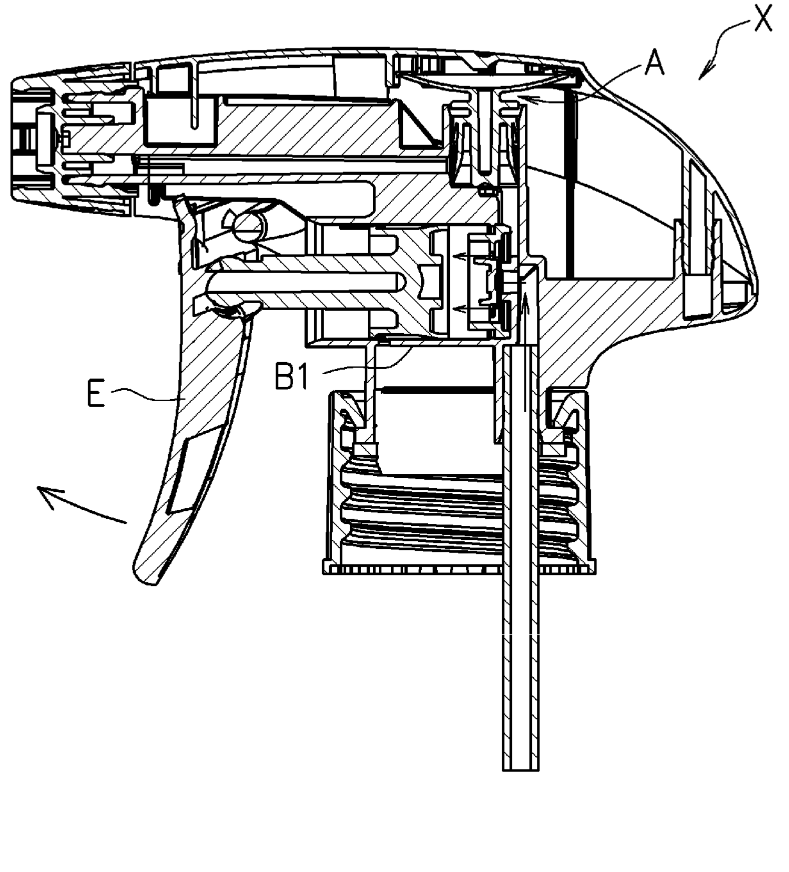
FIG. 11 depicts a longitudinal section of the accumulator spray when the trigger portion is in the course of returning to an original position by a return spring portion.

FIG. 11 depicts a longitudinal section of the accumulator spray when the trigger portion E is in the course of returning to the original position by the return spring portion.

With this, the inside of the main cylinder portion B1 is placed under negative pressure, the F valve FV is open (at this time, the S valve structure A is closed), and the liquid inside the container I is suctioned up to the inside of the main cylinder portion B1 for filling.

The above-described operation is repeated.

In the foregoing, while a preferred embodiment of the present invention has been described, the present invention is not meant to be limited to the above-described embodiment.

Figure 12:
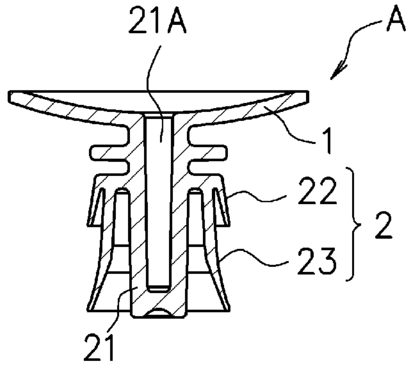
FIG. 12 is a longitudinal sectional view depicting a modification example of the S valve structure.

FIG. 12 is a longitudinal sectional view depicting a modification example of the S valve structure A.

In this S valve structure A, the shape of the spring portion 1 is different from that described above, and is an inverted dome shape but having a smaller diameter and a larger material thickness.

This is effective when a stronger spring-back force of the spring portion 1 is required.

Figure 13:
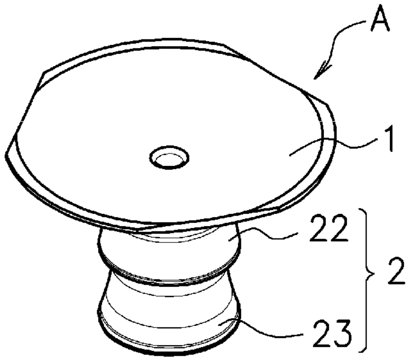
Figure 13:
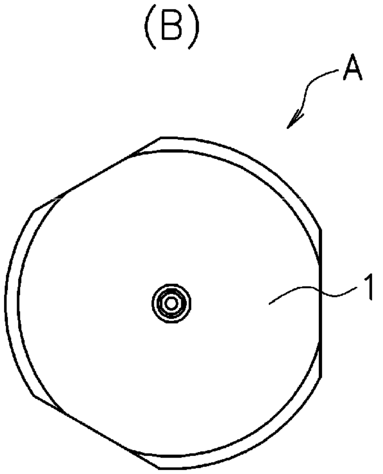

FIG. 13 depicts another modification example of the S valve structure A, in which (A) is a perspective view and (B) is a plan view.

While the shape of the spring portion 1 is a dome shape in this S valve structure A, an upper end portion, which is a portion abutting on the support wall portion C1 of the cover portion C, has a polygonal shape (here, a hexagonal shape).

And, the sides of the polygonal shape have straight lines and arcs alternately formed, and half of the sides are straight lines.

By changing the number of sides, the spring force (that is, spring-back force) of the spring portion 1 can also be change accordingly.

For example, the spring force can be made smaller in a hexagon than in an octagon.

Figure 14:
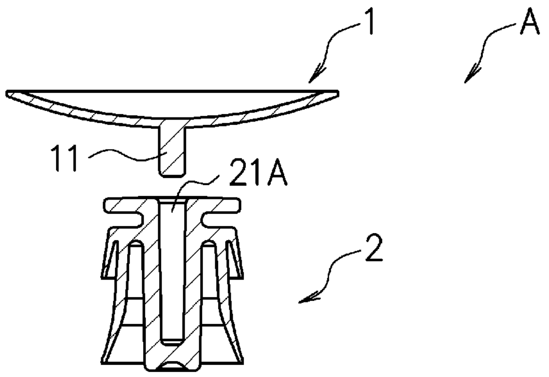
FIG. 14 is a longitudinal sectional view depicting still another modification example of the S valve structure.

FIG. 14 is a longitudinal sectional view depicting still another modification example of the S valve structure A.

In this S valve structure A, the spring portion 1 and the valve piston portion 2 are separately formed and, with part of the spring portion 1 inserted and fixed to the valve piston portion 2, both are integrated.

In the dome-shaped spring portion 1, a support strut 11 droops at its center portion. In the S valve piston portion 2, on the other hand, a hollow hole 21A is formed.

With the support strut 11 of the spring portion 1 press-fitting to the hollow hole 21A of the valve piston portion 2, both are integrated. As a matter of course, they can be integrated with the use of an adhesive.

The material of the spring portion 1 and the material of the valve piston portion 2 can be different. By selecting the material of that spring portion 1, it is possible to change the spring force.

Also, if either one is broken, that can be replaced with a new one.

Note that as the material of the base body B having the main cylinder portion B1 and the sub-cylinder portion B2 described above, a material such as PP resin (polypropylene resin) or the like is suitably used.

Also, as a material of the S valve structure A, a material such as PP resin, POM resin (poly acetal resin), or the like is suitably used.

INDUSTRIAL APPLICABILITY

The S valve structure A of the present embodiment is to be incorporated in the accumulator spray X with a pulling force of the trigger portion E reduced as much as possible, and can be easily used even by children or elderly people who are weak and have low grip strength.

This is quite useful.

REFERENCE SIGNS LIST

X . . . accumulator spray
A . . . S valve structure
1 . . . spring portion
11 . . . support strut
2 . . . valve piston portion
21 . . . core rod portion
21A . . . center hole
22 . . . outer skirt portion
23 . . . inner skirt portion
23A . . . lower end portion (end portion)'
24 . . . upper flange portion
B . . . base body
B1 . . . main cylinder portion
B2 . . . sub-cylinder portion
B21 . . . vertical groove portion
B22 . . . through hole
B23 . . . cross stalk
B3 . . . lower flange portion
C . . . cover portion
C1 . . . support wall portion
D . . . piston portion
E . . . trigger portion
F . . . nozzle portion
G . . . cap portion
H . . . introduction tube
I . . . trigger-specific return spring
J . . . container
FV . . . F valve
P1 . . . first passage portion
P2 . . . second passage portion
P3 . . . third passage portion

The invention claimed is:

1. A second valve structure in an accumulator sprayer to be attached to a container to suction liquid in the container from an introduction tube via a first valve into a main cylinder portion, apply pressure to the liquid in the main cylinder portion and, when the pressure exceeds a certain pressure eject the liquid via a second valve structure from a nozzle portion, wherein the second valve structure is formed of a spring portion and a valve piston portion drooping from the spring portion, and the valve piston portion includes a core rod portion, an outer skirt portion extending downward from an outer circumference of the core rod portion and an inner skirt portion extending downward from the outer circumference of the core rod portion and extending longer than the outer skirt portion, wherein the valve piston portion is configured to be placed in a sub-cylinder portion having a circular hollow space surrounded with an inner circumferential wall of the sub-cylinder portion, the sub-cylinder portion extends in an up-down direction, and the valve piston portion is configured to slide inside the sub-cylinder portion in the up-down direction between a closed state in which the valve piston portion is in the sub-cylinder portion and an open state in which the valve piston portion is out of the sub-cylinder portion, the valve piston portion has an upper flange portion that protrudes radially from the core rod portion, in the closed state, the upper flange portion is positioned inside the sub-cylinder portion to prevent the valve piston portion from swaying in a lateral direction, which is perpendicular to the up-down direction, by contacting the inner circumferential wall of the sub-cylinder portion, and in the open state, the upper flange portion is positioned out of the sub-cylinder portion.

2. The second valve structure according to claim 1, wherein the spring portion is in an inverted dome shape.

3. The second valve structure according to claim 1, wherein with part of the spring portion inserted and fixed to the valve piston portion, both are integrated.

4. The second valve structure according to claim 1, wherein the valve piston portion has a center hole formed therein, and is open at a center portion of the spring portion.

5. An accumulator sprayer including the second valve structure according to claim 1.

6. The second valve structure according to claim 1, wherein the inner circumferential wall of the sub-cylinder portion has a through hole that is connected to the nozzle portion, and in the open state, the liquid supplied from the main cylinder portion into the sub-cylinder portion passes through the through hole to reach the nozzle portion.

7. The second valve structure according to claim 6, wherein the liquid supplied from the main cylinder portion enters the sub-cylinder portion from a bottom of the sub-cylinder portion, the outer skirt portion is positioned above the inner skirt portion with respect to the up-down direction, in the closed state, a lower end portion of the inner skirt portion is positioned below the through hole to seal the liquid moving upward, and in the open state, the lower end portion of the inner skirt portion is positioned on or above the through hole to allow the liquid to reach the nozzle portion, and the outer skirt portion is positioned above the through hole to seal the liquid moving upward.

8. The second valve structure according to claim 7, wherein the outer skirt portion is configured to play a role of sealing to seal the liquid moving upward, and the inner skirt portion is configured to play a role of a valve body to control opening and closing of a passage between the nozzle portion and the main cylinder portion.

* * * * *